W. E. KIDNEY.
CHOPPING MACHINE.
APPLICATION FILED JAN. 11, 1918.
1,377,203.
Patented May 10, 1921.
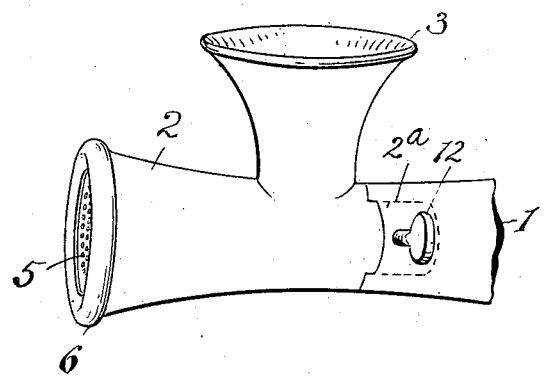
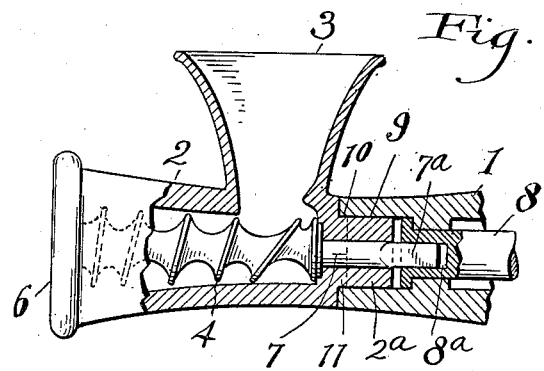
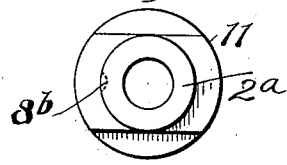
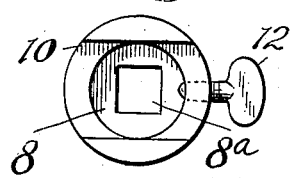
Inventor:
Willie E. Kidney
By Thurston & Reve
attys.

UNITED STATES PATENT OFFICE.

WILLIS E. KIDNEY, OF CLEVELAND, OHIO, ASSIGNOR TO THE CLEVELAND ELECTRIC MACHINE AND MANUFACTURING COMPANY, OF CLEVELAND, OHIO, A CORPORATION OF OHIO.

CHOPPING-MACHINE.

1,377,203.  Specification of Letters Patent.  Patented May 10, 1921.

Application filed January 11, 1918. Serial No. 211,408.

*To all whom it may concern:*

Be it known that I, WILLIS E. KIDNEY, a citizen of the United States, residing at Cleveland, in the county of Cuyahoga and State of Ohio, have invented a certain new and useful Improvement in Chopping-Machines, of which the following is a full, clear, and exact description.

This invention relates to a macerating machine such as in the trade are known as meat chopping machines, food choppers and similar machines, the invention herein described being particularly directed to a construction by which the chopper part proper is mounted and connected with its supporting standard.

The object of the invention is to provide a construction which readily permits removal of the chopper from its standard, properly centers the chopper with respect to its standard and driving connections when replacing the chopper upon the standard, and further provides a robust connection which takes all the turning thrust upon the chopper incident to its operation.

Reference should be had to the accompanying drawings in which Figure 1 is an elevation in perspective of a portion of a machine embodying my invention; Fig. 2 is a side elevation with portions in section of a machine; Fig. 3 is an end elevation of a portion of the standard of a machine with the chopper part removed; Fig. 4 is an end elevation of a portion of the chopper part.

In the drawings, the part indicated at 1 is an arm or support which forms a part of the standard that supports the whole machine structure. The standard carries a motor or some other operating means, the motor and the portion of the standard which is connected with the part 1 not being shown inasmuch as they form no real part of the invention.

The chopper part proper is indicated at 2, and consists of a hollow barrel with a funnel-shaped feeder indicated at 3. Within the portion 2 there is a screw member 4, which at one ends is mounted adjacent a perforated plate 5, which plate is held by a threaded ring 6. The opposite end of the screw member 4, to which reference has been made, is secured to a shaft 7 which is journaled in a portion $2^a$ of the chopper member. The shaft 7 coöperates with a shaft 8, which in turn is supported in part by the portion 1 of the standard, and at its opposite end is suitably connected with the source of motive power.

The end of the shaft 8 is provided with a squared socket $8^a$ which is adapted to receive the squared ends $7^a$ on the shaft 7. This then permits a driving connection to be effected between the shaft 7 and the shaft 8.

The chopper member 2 has the part $2^a$ thereof formed as an extension, and is preferably cylindrical. The cylindrical portion 8 has a neat fit within a recessed portion or socket 9 of the member 1.

Across the face of the member 1, adjacent the socket 9 there is a recessed or grooved portion 10, this grooved portion extending substantially equally upon both sides of the horizontal axis or median line of the portion 1 of the standard.

The portion of the part 2 adjacent the extension 8 is formed with a projecting part 11, which is equally spaced upon both sides of the horizontal median line of the projection 8.

When the member 2 and the standard 1 are brought together so that the portion 8 of the part 2 is inserted in the socket 9 of the part 1, the projection 11 fits within and occupies the recess or grooved part 10, thus holding the chopper portion against rotation relative to the standard 1.

In order to retain the parts thus described in their assembled relation, a screw 12 having a finger engaging part is threaded through an opening in the side of the portion 1 of the standard. Preferably the extension 8 is provided with a recess $8^b$ into which the end of the screw 12 may be turned, and when the screw 12 is thus turned, it prevents withdrawal or separation of the chopper part 2 with respect to the standard 1.

The construction described accomplishes two results. First, when the chopper 2 is introduced to the standard 1, the engagement of the projection 11 in the recess 10 properly centers the chopper portion upon its standard. In the second place, the projection 11 occupying the recess 10, is a strong and robust construction which prevents any relative turning of the chopper part with respect to its standard 1, when the screw 4 is operating upon material which it is feeding toward the cutter. The set screw 12 receives no part of this turning thrust, the thrust being taken up entirely by the engagement of the projection 11 in the groove or recess 10. In the construction as described, the set screw 12 merely acts to lock and hold the portion 2 against removal.

Having described my invention, what I claim is:

1. In a macerating machine, a support member having a socket formed therein, a shaft extending into said socket and having an irregular shaped opening in the end thereof, a removable head member having an extension, a macerating member within the head member, said macerating member having a shaft which extends through an opening in the said extension, the end of the said macerating shaft being adapted to fit in the irregular shaped opening in the first mentioned shaft, with a sliding fit, the said extension on the head fitting in the socket of the support member, one of said members having a projection, the other of said members having a depression, the said projection and extension being located upon engaging surfaces of the head and support, said projection and depression engaging to properly register and hold against relative rotation between the head and support.

2. In a macerating machine, a support member having a socket formed therein, a shaft extending into said socket and having an irregular shaped opening in the end thereof, a removable head member having an extension, a macerating member within the head member, said macerating member having a shaft which extends through an opening in the said extension, the end of the said macerating shaft being adapted to fit in the irregular shaped opening in the first mentioned shaft with a sliding fit, the said extension on the head fitting in the socket of the support member, one of said members having a depression extending transversely in the engaging surfaces thereof, the other member having a complementary projection formed on the surface thereof, the projection and depression engaging to properly center and prevent relative rotation of the head and support.

In testimony whereof, I hereunto affix my signature.

WILLIS E. KIDNEY.